United States Patent Office 3,725,139
Patented Apr. 3, 1973

3,725,139
METHOD FOR IMPROVING PERFORMANCE OF HIGH FREQUENCY CABLE
Alfred Staschewski, Langenhagen, Rudolf Pflaum and Helmut Martin, Hannover, and Helmut Hildebrand, Langenhagen, Germany, assignors to Kabel- und Metallwerke Gutehoffnungshutte Aktiengesellschaft, Hannover, Germany
No Drawing. Filed Feb. 3, 1971, Ser. No. 112,460
Claims priority, application Germany, Feb. 26, 1970,
P 20 08 895.3
Int. Cl. C23f 1/24; H01b 7/34
U.S. Cl. 148—6.31    5 Claims

ABSTRACT OF THE DISCLOSURE

A high frequency cable with gaseous e.g. air space insulation between an inner and an outer conductor is improved by temporarily exposing the conductors to layer forming corrosion.

---

The present invention relates to a high frequency cable of the gas filled variety with at least one inner conductor, an outer conductor, a spacer means that maintains the two conductors in spaced apart relationship and defining a hollow air space or cavity filled with dielectric material and serving as insulation. This space may be filled with air. Upon operating cables of that variety with H.F. energy ohmic losses in the conductors as well as in the dielectric material as disposed between the inner and outer conductor generally provide heating of the cable construction. These thermal losses are transmitted to the environment whereby the cable structure itself functions as thermal resistance and conductor or conductance for the flow of thermal energy from the source of its development to the exterior.

Before proceeding further, the following general remarks will be helpful. For a given cable geometry, thermal energy may be assumed to develop on basis of losses in the inner conductor. This energy will always flow off to the environment through the cable structure. Thermal flow generally is proportional, for example, to the average thermal conductivity of the structure and the temperature drop or differential between center and environment. The temperature of the heat sink in this problem of heat transport is given and is equal to ambient temperature of the location of installation of the cable.

For a given cable construction and ambient temperature, the temperature at the center must increase with an increase of developed thermal energy. Conversely, for a particular quantity of developed thermal energy the temperature in the center of the cable will be the lower, the better, i.e., the higher the thermal conductivity through the cable structure, again for the same ambient conditions. To say it differently, the temperature differential will be proportional to the developed thermal energy and the inverse of thermal conductance, which is the thermal resistance of the cable, always taken radially across the cable. The thermal energy in turn is proportional to the product of transmitted H.F. power and attenuation in the cable.

A cable will be able to withstand heating only up to a particular temperature that must not be exceeded. This thermal limit is primarily determined by the insulative properties of the dielectric substance as disposed between the conductors. In view of a change in ambient temperatures, for example, due to change in season, or weather, it is apparent that a margin of safety is needed here which has to be taken into consideration for establishing construction parameters for the cable. Thus, the permissible temperature differential is more or less definitely limited. Taking these aspects into consideration it is apparent that maximum H.F. power that can be transmitted safely is proportional to the product of maximum permissible temperature differential and thermal conductance or conductivity.

It can thus be seen that H.F. power transmission can be increased only if thermal conductance through the cable is improved for a chosen geometry and for chosen dimensions. The thermal resistance of an H.F. cable as offered to the flow of thermal energy can be divided in accordance with the geometry involved. There is a first thermal resistance between the inner and outer conductor and a second thermal resistance between the inner surface of the outer conductor and the environment. During operation of the cable a temperature drop and gradient develops between the center of the inner cable conductor and the environment. In view of the geometry involved a first gradient or temperature drop develops between inner and outer conductors while a second temperature gradient and drop develops from the outer conductor to the exterior.

It can thus be seen that the maximum permissible H.F. power that can be transmitted without damage to the cable can be increased only by reducing at least one of the two thermal resistances as defined. It was found in practice that temperature differential from inner to outer conductors within the cables is considerably larger than the temperature drop from outer conductor to environment. Thus, the thermal conductance between inner and outer conductor is of considerably larger influence on the heat flow conditions in the cable than the thermal conductance through outer conductor into the environment. Therefore, an improvement concerning an increase of H.F. power that can be transmitted predominantly requires improvements in the thermal conductance between inner and outer conductors.

The thermal conductivity or conductance between inner and outer cable conductors is the result of composite effects which essentially include three components; these components participate in the conduction of thermal energy to a different degree. The first component is the conduction proper of thermal energy through insulating material on basis of molecular heat transport. However molecular heat transport is relatively low for in air insulation and, therefore, can be neglected. The second component is thermal convection in the air space between inner and outer conductor. It was found that the predominant portion of heat transfer is due to convection. The third component is radiation as between inner and outer conductor, and its share and participation in the overall heat transfer is somewhere in between molecular conduction and conduction by convection.

It is known to increase heat conduction by convection, by filling the interior of the cable with a particular gas and sustaining elevated gas pressure therein. The convective conduction is, in fact, increased in that manner; nevertheless the entire thermal resistance between the inner and outer cable conductor remains rather high, so that this particular feature does not provide for satisfactory improvement. Moreover, the cable construction as a whole is more complex if pressurization has to be provided for. The pressure, in order to be effective, should go up to 5 atmospheres, and in order to sustain that kind of pressure the mechanical strength of the cable must be considerably increased as compared with other types of constructions. Therefore, it can be said that the problem of increasing thermal conduction by lowering thermal resistance between inner ad outer cable conductor has not yet been satisfactorily resolved.

It is an object of the present invention to improve on the thermal conditions in an air filled H.F. cable so that ultimately the H.F. power that is to be transmitted can be increased for a cable or given dimensions and mechanical strength. The problem is solved in accordance with the preferred embodiment of the present invention in that the metallic surfaces of the cable conductors as facing each other across the air space in between are temporarily subjected to a chemical reaction resulting in the formation of a layer analagous to a layer formed by corrosion. Subsequently, the substance that produces the reaction is removed, and the cable space is filled, for example, with air.

Layer forming corrosion is used here as a descriptive term for chemical reaction with the material of the conductors on their respective surfaces under formation of layers thereon. The term corrosion is thus used here intentionally to encompass variety of chemical reactions, usually unwanted, but suitable here for the formation of a layer on the exposed conductor surfaces by chemical reaction therewith. As a consequence of this unusual feature heat transfer through radiation from such a surface is increased to such an extent, that quantitatively its contribution to the total heat flow has the same order of magnitude as heat transfer by convection through the air space.

The emission of radiation by a conductor covered with such a corrosion layer in accordance with the invention is almost thirty-fold increased. The bare and bright conductor surface has an emission factor of 0.03, the emission factor is increased up to a value of 0.8 through development of a corrosion layer. Moreover, it was found that actually any known layer forming corrosion increases the emissivity of such a conductor for thermal radiation. For example, any known layer forming corrosion of copper will produce such an effect. It is noted that copper is usually used as a conductor for such a H.F. cable, aluminum in a lesser extent. As a consequence of significantly raising thermal radiation across the air space in the cable the composite thermal resistance between the two conductors is lowered significantly, and the rate of heat transfer from inner to outer conductor is increased accordingly. Therefore, for similar dimensions of the H.F. cable the maximum permissible H.F. power that can be transmitted is increased accordingly.

A H.F. cable can be provided in accordance with the present invention in that at first the cable is constructed as usual, using copper conductors, suitable spaces, etc. Next, a fluid, be it a gas or a liquid, for example, hydrogen sulfide of low concentration is fed into the space between the two conductors. The fluid is maintained within the cable for a period that is not sharply defined but is preferably sufficiently long so that by chemical reaction a layer has been formed with certainty on the surfaces of the conductors so that the conductors can be regarded as completely corroded on their surfaces.

It will be noted that the exposure time per se is not critical as even a very short exposure will produce some corrosion and, therefore, there will be some improvement in the emissivity of the coductors. On the other hand, excessive exposure will lead to destruction of the conductors; however, it can readily be seen that by choosing a low concentration of the corroding fluid the exposure time can be made highly uncritical. Actually, the exposure time can be controlled merely visually through observation of a surface portion as exposed and as it begins to discolor. In an actual example copper conductors were exposed to hydrogen sulfide at a concentration of 50% for a period of 36 hours producing a sufficiently thick but actually quite thin layer of copper sulfide estimated at a thickness of 0.01 micron.

After the particular fluid has been removed from the cable air is charged into the space and of course care has to be taken that all of the corroding fluid is removed so that the corrosion process is definitely interrupted and terminated. Finally the cable is sealed and is now ready for installation. It can thus be seen that only little additional equipment is needed for practicing the invention. The cable is manufactured as usual, and just prior to sealing the air space the interior of the cable is subjected temporarily to layer forming corrosion and is then vented.

Another advantage of the invention is to be seen in that actually a cable which is already installed and in use can be improved in that manner. The inner cable space is simply connected temporarily to a source for the corrosion producing material to obtain the corrosion layer, whereafter the corroding fluid is pumped out and replaced by air. Thus, a cable can be operated at higher power as far as H.F. transmission is concerned than before. It was found also that the particular medium used for production of a corrosion layer can be of any kind provided the exposure results in formation of a layer of a composition that includes the material of the conductor as a component. Other corroding materials that can be used are, for example, those that result in a patina layer.

The invention is not limited to the embodiments described above but all changes and modifications thereof not constituting departures from the spirit and scope of the invention are intended to be included.

We claim:

1. Method of improving high frequency cable performance having at least one inner conductor and an outer conductor, the conductors made of aluminum or copper, there being a hollow space in between the conductors having inner surfaces facing each other across the space, comprising the steps of, exposing the inner surfaces of the conductors when already in concentric assembly temporarily to a corroding fluid then forming a layer on the inner surfaces of the conductors through chemical reaction therewith to increase the emissivity of thermal radiation across the space between the conductors; and removing the fluid from the space between the conductors.

2. Method as in claim 1 the fluid selected to provide a sulfide layer through reaction with the conductors.

3. Method as in claim 1 wherein the conductors are made of copper the fluid providing a corrosion layer that includes copper.

4. Method as in claim 1 the fluid being hydrogen sulfide.

5. Method as in claim 1 the fluid producing a patina layer on the surface.

References Cited

UNITED STATES PATENTS

| | | | |
|---|---|---|---|
| 3,564,108 | 2/1971 | Schmitz | 174—16 B |
| 2,115,777 | 5/1938 | Johnson | 165—133 X |
| 2,167,378 | 7/1939 | Shoemaker et al. | 174—16 B |
| 2,288,788 | 7/1942 | Clark et al. | 148—6.24 |
| 3,284,249 | 11/1966 | Osborn | 148—6.24 |
| 3,615,887 | 10/1971 | Ware | 148—6.24 X |
| 449,035 | 3/1891 | Capek | 117—231 X |
| 1,708,935 | 4/1929 | Christopher | 165—133 |
| 3,569,606 | 3/1971 | Clin | 174—28 X |

OTHER REFERENCES

Salem et al.: Chem. Abstracts 57:6057f, 1962.
Yamaguchi et al.: Chem. Abstracts 65:1870f, 1966.

RALPH S. KENDALL, Primary Examiner

U.S. Cl. X.R.

148—6.14 R, 6.24, 6.27, 6.3; 174—16 R, 28